(No Model.)

G. R. FORD.
FLUE SCRAPER.

No. 560,091. Patented May 12, 1896.

Witnesses:
R. J. Jacker,
C. Hondelink

Inventor:
George R. Ford
By Edward Taggart, Atty.

UNITED STATES PATENT OFFICE.

GEORGE R. FORD, OF CHICAGO, ILLINOIS.

FLUE-SCRAPER.

SPECIFICATION forming part of Letters Patent No. 560,091, dated May 12, 1896.

Application filed July 15, 1895. Serial No. 556,053. (No model.)

*To all whom it may concern:*

Be it known that I, GEORGE R. FORD, a citizen of the United States, residing at the city of Chicago, in the county of Cook and State of Illinois, have invented certain new and useful Improvements in Flue-Scrapers, of which the following is a specification.

My invention relates to that class of flue-scrapers having a series of springs, each spring carrying a scraper or knife, the whole supported upon a suitable shank, to which may be attached a handle for use in cleaning the flues of a boiler, and the object of my invention is to improve the prior devices of this character; and to this end it consists in the features of construction and the combination and arrangement of parts hereinafter described and claimed, reference being had to the accompanying drawings, in which—

Figure 1:
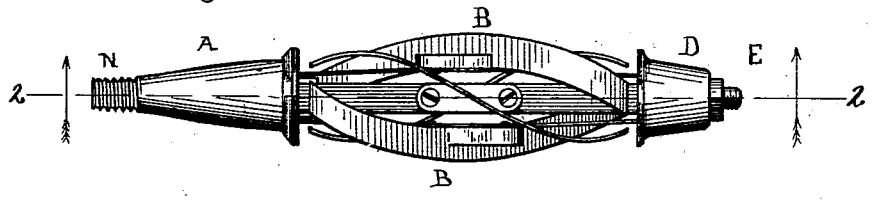
Figure 2:
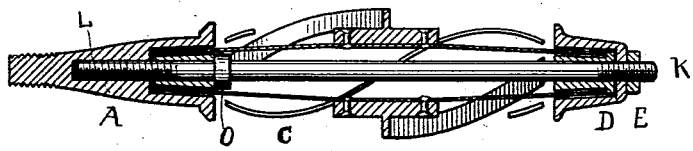
Figure 3:
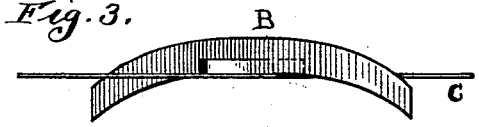
Figure 4:
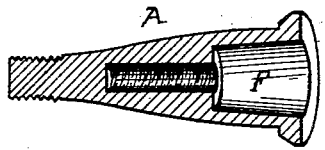
Figure 5:
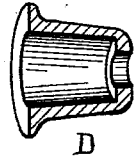
Figure 6:
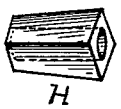
Figure 7:
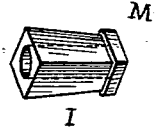

Figure 1 shows a side view of the scraper without the handle attached. Fig. 2 shows a sectional view on line 2 2 of Fig. 1. Fig. 3 shows a perspective view of one of the scrapers attached to its spring. Fig. 4 shows a sectional view of the shank provided with a conical opening into which fits a conical socket, said conical socket adapted to receive a central thimble. Fig. 5 shows a sectional view of the socket which is placed at the other end of the scraper, the same being provided with a conical socket and adapted to receive a thimble, shown in Fig. 7. Fig. 6 is a perspective view of the thimble which fits into the shank end of the scraper, and Fig. 7 shows a socket which is adapted to fit into the socket at the opposite end of the scraper.

Similar letters refer to similar parts throughout the several views.

A represents the shank, preferably of iron or other similar material. It may be provided with a screw, as N, for the purpose of attaching the same to the handle. This shank is provided with a conical opening F. Said opening F is provided at the bottom with a round hole, preferably.

K is a rod which is screwed or otherwise attached to the shank, the same passing through the round hole in the thimble H, the thimble H fitting into the conical opening F in the shank, leaving apertures on four sides. The rod K is provided with a collar or enlargement or other suitable means for the purpose of retaining the thimble H in position in the socket.

C represents the springs, preferably four in number, the shank ends of which are entered between the thimble and the walls of the socket. The other ends of the springs are secured at the other end of the scraper in the following manner:

D represents a socket having a conical opening, preferably, for the reception of the thimble I, said thimble I being square in cross-section and provided with a flange M, the socket D being placed upon the rod K and secured thereon by means of a nut E, said nut E serving both the purpose of retaining the socket D in position and that of adjusting the springs, as hereinafter described.

The knives are shown by B and are securely attached to the springs near the center.

L represents a screw-thread by means of which the rod K is secured to the shank at one end. The ends of the springs which support the knives or scraper at the shank end are adapted to bear against the bottom of the socket at the shank end and at the other end are adapted to bear against the flange M of the thimble I, and when the nut E is turned up upon the rod K the springs are securely held in place.

As the knives are worn by use the nut E can be tightened, thereby springing outwardly the supporting-springs C and at the same time throwing the knives outwardly, so as to fill the entire cavity within the tube in the boiler. Thus the scraper can be used until the knives are entirely worn out, and new knives or scrapers can be placed upon the springs. By this means also the flue-scraper may be adapted to flues of different sizes. The socket at the shank end is shown by F, and it may be made of any suitable depth to receive the ends of the springs.

In the drawings I have shown a flue-scraper provided with four elliptical springs. It is evident that the number may be varied, but I consider four sufficient and preferable to a greater or less number. The knives may be attached to the springs by screws or in any other suitable manner.

Having thus described my invention, what I claim to have invented, and desire to secure by Letters Patent, is—

1. In a boiler-flue scraper, the combination of a shank provided with a conical opening, a plurality of springs having their ends supported in the conical opening, a thimble fitting into the opening in position to retain the springs in position in the shank, a plurality of knives, one for each spring, a socket adapted to receive the ends of the springs opposite the shank, a flanged thimble fitting into the socket and retaining the springs in the socket, the flange serving as an abutting surface against which the ends of the springs abut, a rod or bolt secured in the shank, extending continuously between the springs and through the said socket and a nut engaging with said bolt for the purpose of retaining the socket in place and adjusting the same upon the bolt so as to spread and expand the springs, and thereby the knives, substantially as described.

2. In combination with a shank having a conical opening, a thimble square in cross-section fitting into the said shank, leaving openings for the reception of the supporting-springs, a plurality of supporting-springs, each spring bearing a knife or scraper, the ends of the springs fitting into the shank between the thimble and the outer walls of the conical opening, a socket at the opposite end of the said springs having a conical opening, a thimble square in cross-section fitting into said socket, leaving openings for the reception of the end of the springs, a rod inserted into and secured within the shank and extending continuously between the springs and through the said socket, and a nut applied to one end of the rod and bearing against the socket for expanding the springs, substantially as and for the purpose described.

3. In combination with a bolt, a shank to which one end of said bolt is fastened, a conical opening around the bolt, a thimble fitting into the conical opening, a plurality of springs, one end of which is fitted between the thimble and the walls of the conical opening, a plurality of knives, one for each spring, a socket at the opposite end of the springs adapted to receive and retain the ends of the springs in position, a thimble having a flange fitting into the said conical opening, the ends of the springs being brought in contact with the said flange, a rod inserted into and secured within the shank and extending continuously between the springs and through the said socket, and a nut applied to one end of the rod and bearing against the socket for expanding the springs, substantially as and for the purpose described.

In witness whereof I have hereunto set my hand and seal in the presence of two witnesses.

GEORGE R. FORD. [L. S.]

Witnesses:
   EDWARD TAGGART,
   CHRISTOPHER HONDELINK.